United States Patent [19]

James

[11] Patent Number: 4,817,978
[45] Date of Patent: Apr. 4, 1989

[54] TRAILER HITCH ASSEMBLIES

[76] Inventor: Loyal W. James, 6038 Anita Rd., Chico, Calif. 95926

[21] Appl. No.: 197,649

[22] Filed: May 23, 1988

Related U.S. Application Data

[63] Continuation-in-part of Ser. No. 88,406, Aug. 24, 1987, Pat. No. 4,746,138.

[51] Int. Cl.$^4$ ............................................... B60D 1/06
[52] U.S. Cl. ..................................... 280/487; 267/138
[58] Field of Search ............... 280/483, 484, 485, 486, 280/487, 511; 267/138

[56] References Cited

U.S. PATENT DOCUMENTS

| | | | |
|---|---|---|---|
| 1,201,222 | 10/1916 | Cadman | 280/506 |
| 1,255,384 | 2/1918 | Cadman | 280/506 |
| 1,276,548 | 8/1918 | Litten | 280/492 |
| 1,289,141 | 12/1918 | Ferris | 267/138 |
| 1,743,119 | 1/1930 | Cowell | 280/487 |
| 1,816,121 | 7/1931 | McLamarrah | 267/138 |
| 1,819,393 | 8/1931 | Staley | 267/138 |
| 1,860,391 | 5/1932 | Meyer | 280/477 |
| 2,067,794 | 1/1937 | Seyferth | 280/485 X |
| 2,127,912 | 8/1938 | Graham et al. | 188/142 |
| 2,189,170 | 2/1940 | Gaussoin | 280/123 |
| 2,984,502 | 5/1961 | Tyrell | 280/506 |
| 3,169,783 | 2/1965 | Harbers et al. | 280/485 |
| 3,838,778 | 10/1974 | Appleton | 267/138 X |
| 3,843,162 | 10/1974 | Abromavage | 280/486 |
| 3,961,813 | 6/1976 | Thomas | 280/485 |
| 3,990,722 | 11/1976 | Casad et al. | 280/485 |
| 4,265,465 | 5/1981 | Deitrich | 280/478 A |

Primary Examiner—John A. Pekar
Attorney, Agent, or Firm—Laney, Dougherty, Hessin & Beavers

[57] ABSTRACT

An improved trailer hitch assembly of the draw bar type consisting of a receiver tube mounted on the tow vehicle to receive a draw bar tube in vibration damped retention while extending a hitch ball. The draw bar tube retains a resilient spring block assembly that is secured to the receiver tube by means of a hitch pin and the hitch pin moves within elongated slots on said draw bar tube so that vibration from the draw bar tube is damped by the spring block assembly and isolated from the receiver tube and tow vehicle. A shock absorber is connected between the receiver tube and some point on said draw bar tube.

10 Claims, 4 Drawing Sheets

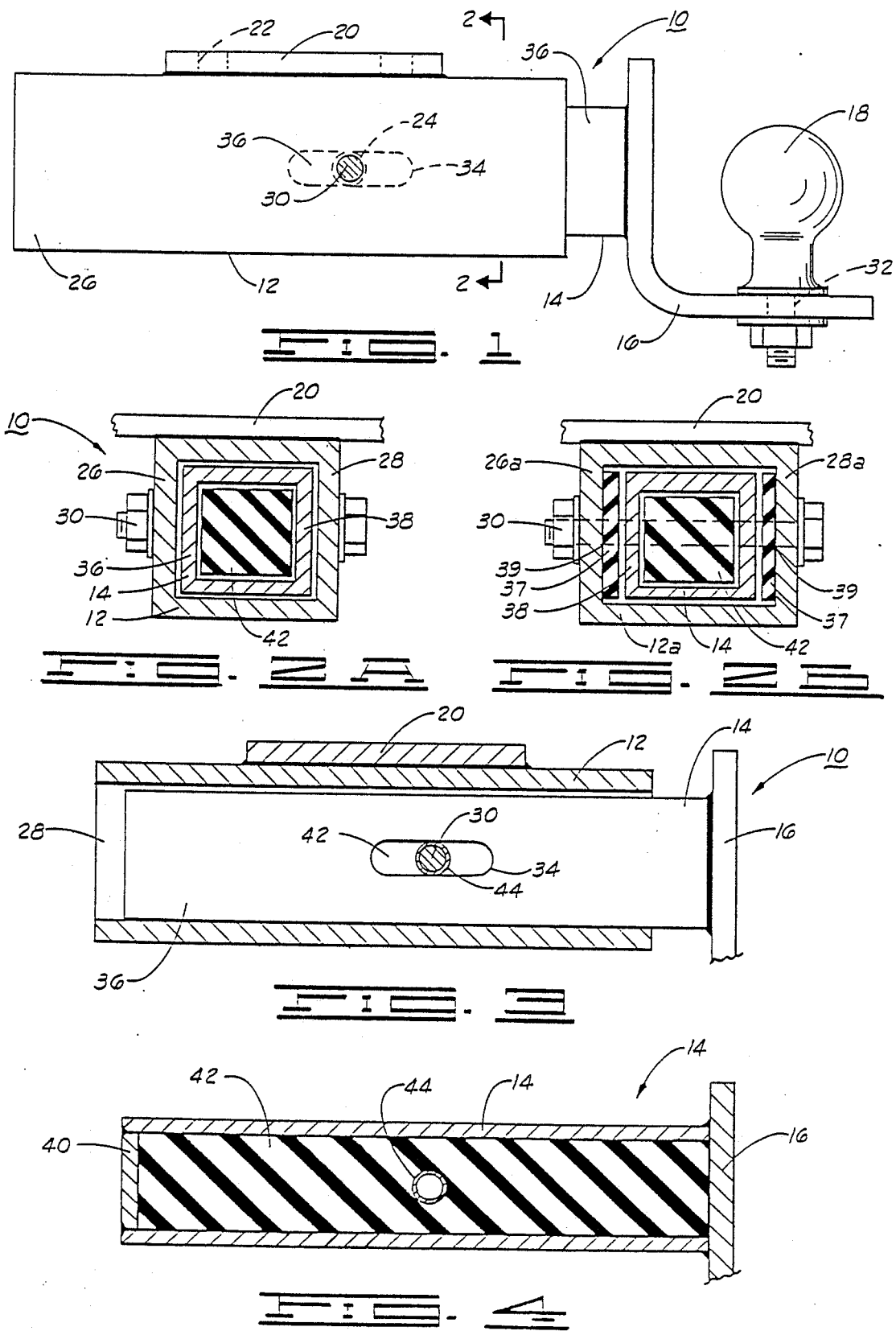

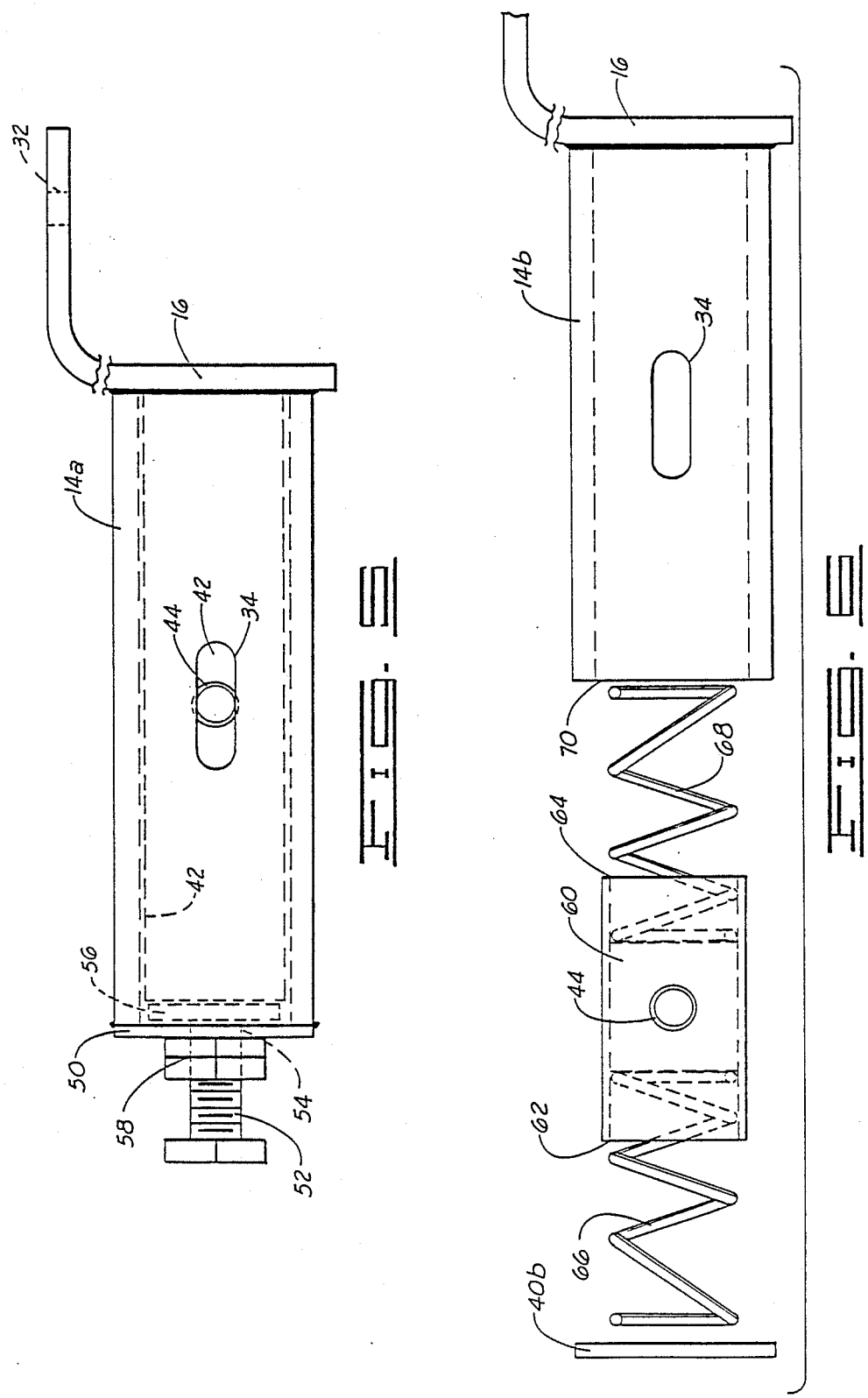

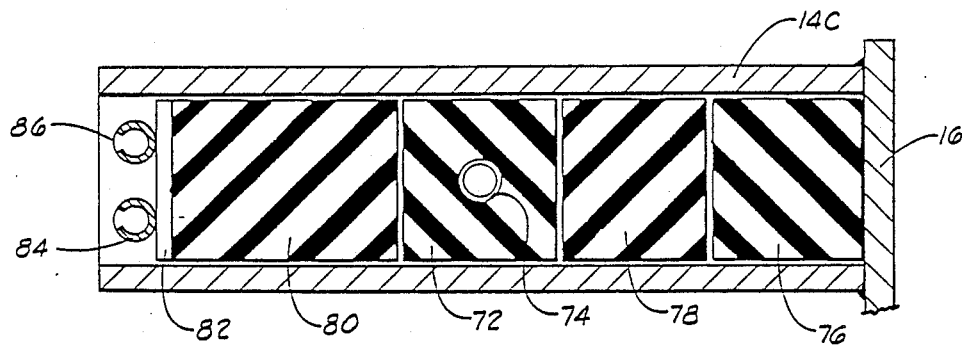
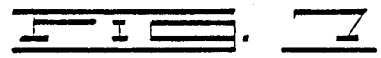
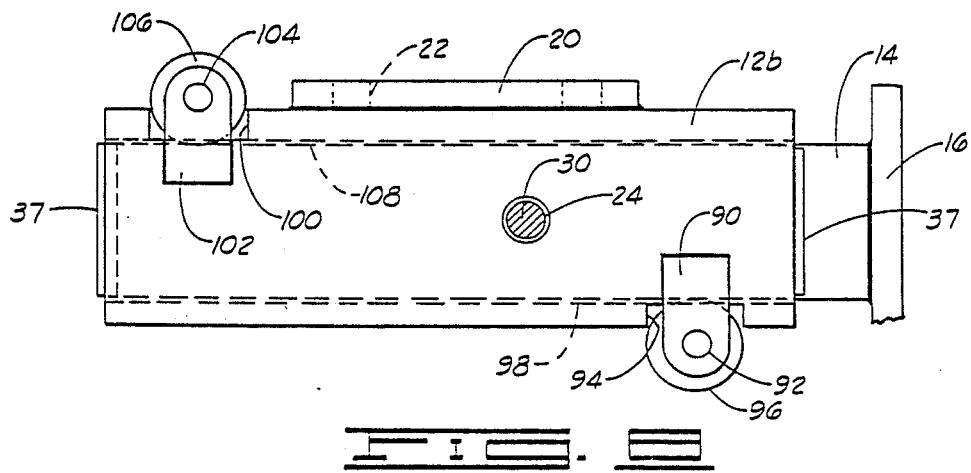
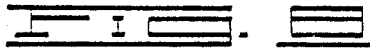
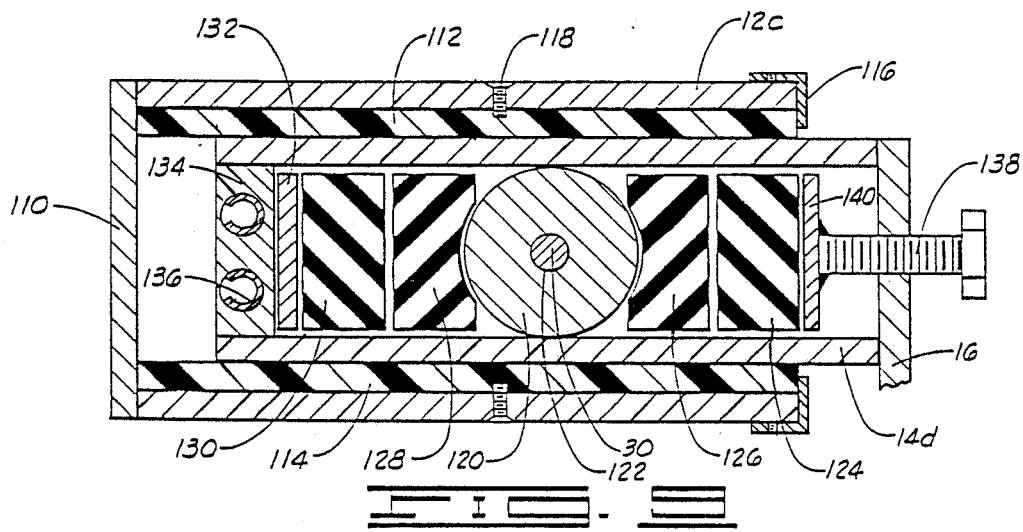
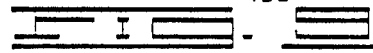

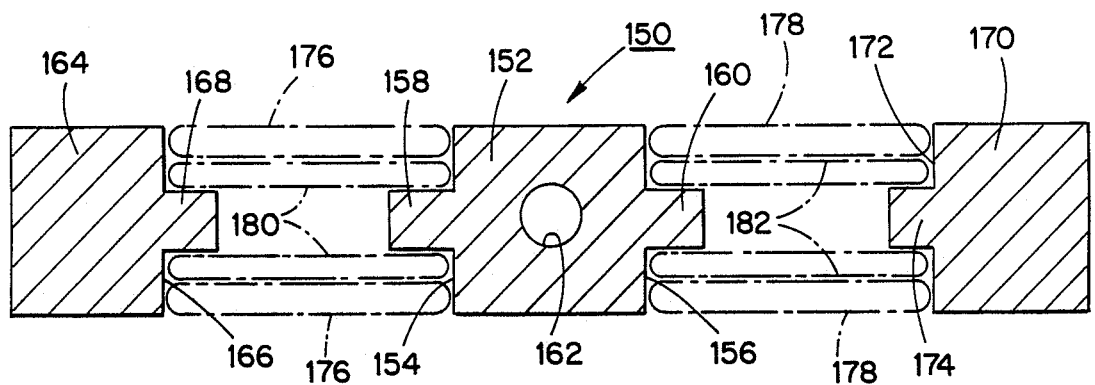
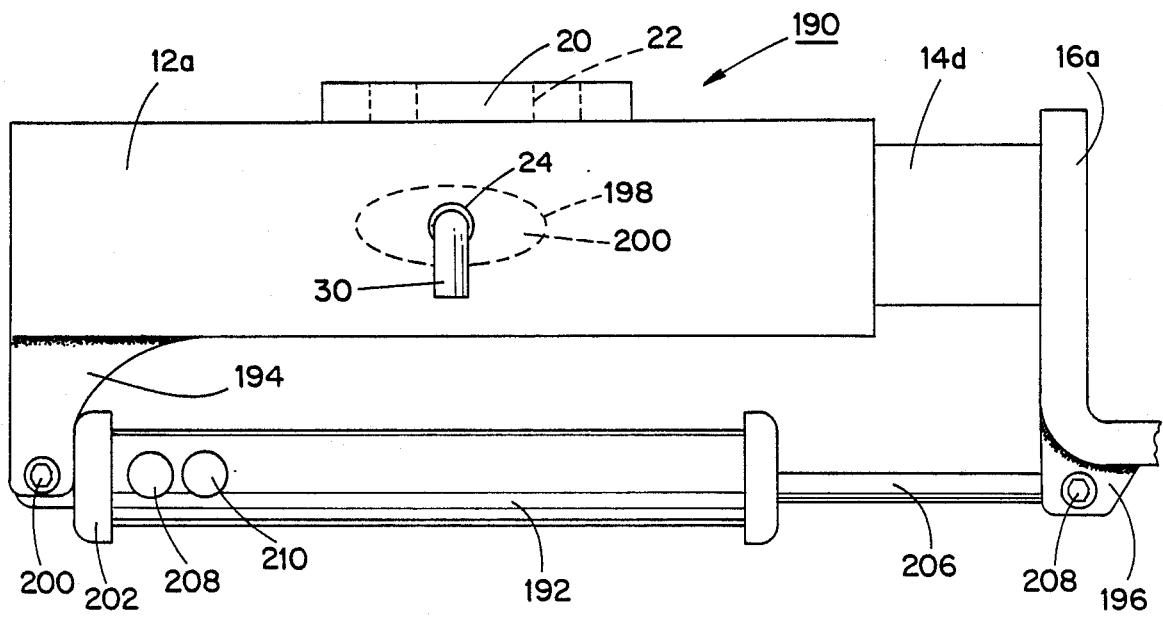

TRAILER HITCH ASSEMBLIES

CROSS-REFERENCE TO RELATED APPLICATION

This application is a continuation-in-part of the U.S. application Ser. No. 088,406 as filed on Aug. 24, 1987, now U.S. Pat. No. 4,746,138, and entitled "IMPROVED TRAILER HITCH ASSEMBLIES".

BACKGROUND OF THE INVENTION

1. Field of the Invention

The invention relates generally to improvements in form and construction of trailer hitch assemblies of the longitudinal draw bar type wherein a resilient spring load is interpositioned to transmit forces between the hitch ball and the towing vehicle thereby to significantly dampen shock vibrations.

2. Description of the Prior Art

Prior art forms of vehicle trailer hitch assembly are many and diverse as developed over a long period of years. There are some types which attempt to incorporate some form of resilient vibration damping device in the hitch tongue, i.e. the draw bar of the towed vehicle. An example of such prior teachings is exemplified by U.S. Pat. Nos. 2,189,170 and 3,961,813, but there are also many other types of draw bar damping device that have been utilized. Some other patents have sought to construct a vibration damping device that is secured to the tow vehicle. U.S. Pat. No. 1,819,393 discloses a form of damping device that is rigid with the towing vehicle and attempts to damp all vibrations from the towing connection by suspending the tow shaft in resilient mounting. Another form of vibration mounting as secured to the vehicle is taught by U.S. Pat. No. 1,816,121 which utilizes a plural spring arrangement as connected through the draw bar or portion of bumper. U.S. Pat. Nos. 3,843,162 and 4,265,465 teach additional types of spring arrangement wherein the spring assembly is secured to the towing vehicle albeit that these structures and their attendant function differ in various ways from the teachings of the present invention.

SUMMARY OF THE INVENTION

The present invention relates to improvements in construction and operation of trailer hitch assemblies of the type wherein a tow bar is extended from the tow vehicle in vibration isolation mount. A receiver tube that is mounted in selected manner from the frame structure of the towing vehicle is adapted to receive a draw bar tube longitudinally therein and a transverse pin connection maintains affixture. While the receiver tube has a circular transverse hole for receiving the pin, the draw bar tube has elongated side holes for receiving the pin which extends through a pin tube supported by resilient vibration damping structure contained within the draw bar tube. The outer end of the draw bar tube includes a tow plate secured thereon which, in turn, receives a selected size of hitch ball. Any vibration occurring at the hitch ball will be damped at the connector pin which is in contact with the resilient damping structure so that very little or no vibration reaches the receiver tube and vehicle frame.

Therefore, it is an object of the present invention to provide a more effective vibration damping trailer hitch.

It is also an object of the invention to provide an inexpensive trailer hitch having vibration isolation capability.

It is yet another object of the invention to provide vibration isolation structure that can be readily adapted and utilized in some existing trailer hitch assemblies.

It is still further an object of the invention to provide vibration and shock damping of a tow bar connection of economical, rugged construction that is capable of adjustment for various heights, weights or balances of loads.

Finally, it is an object of the present invention to provide a readily adjustable tow bar having highly effective vibration isolation capability while also having great versatility of usage.

Other objects and advantages of the invention will be evident from the following detailed description when read in conjunction with the accompanying drawings which illustrate the invention.

BRIEF DESCRIPTION OF THE DRAWINGS

FIG. 1 is a view in side elevation of a trailer hitch constructed in accordance with the present invention;

FIG. 2A is a section taken on lines 2—2 of FIG. 1;

FIG. 2B is a similar sectional view of an alternative structure;

FIG. 3 is a view in side elevation of the hitch assembly with the outer receiver tube shown in section;

FIG. 4 is a view in vertical section of the draw bar tube of the hitch assembly;

FIG. 5 is a view in side elevation of an alternative form of adjustable hitch assembly with interior parts shown in dash-line;

FIG. 6 is an exploded view in side elevation of still another alternative hitch assembly;

FIG. 7 is a vertical sectional view of an alternative form of draw bar tube;

FIG. 8 is a side elevation with parts shown in dash-line of still another alternative form of hitch assembly;

FIG. 9 is a vertical section of yet one more form of alternative hitch assembly;

FIG. 10 is a side view in vertical section with springs shown schematically of yet another form of spring member utilized in the present invention; and FIG. 11 is a side view in elevation of a heavy-duty hitch assembly that includes additional shock absorbing structure.

DETAILED DESCRIPTION OF THE INVENTION

FIGS. 1–4 illustrate the basic hitch assembly 10 consisting of a receiver tube 12, a draw bar tube 14 inserted therethrough and an L-shaped tow plate 16 having the conventional form of hitch ball 18 secured therein. The receiver tube 12 is shown as a square tubing but it could be any type of heavy steel tubing that is commercially available and of sufficient strength for the application. Thus, the receiver tube 12 includes a steel mounting plate 20 secured thereon as by welding, and mounting plate 20 includes a plurality of mounting holes 22 in array that will be consonant with the particular vehicle or model on which the assembly will be utilized. A pair of holes 24 are formed in each side plate 26, 28 of receiver tube 12 in transverse alignment for the purpose of receiving a hitch pin 30, in this case a threaded locking bolt (see FIG. 2). It may be desirable to replace the locking bolt with any type of quick-release connector pin or the like.

The draw bar tube 14 has the L-shaped tow plate 16 secured on the outer end as by welding and a hole 32 is formed for the purpose of receiving a selected type of hitch ball 18. The draw bar tube 14 is selected to be of a size or cross-sectional configuration to smoothly slide within receiver tube 12 and it should be noted that it may be inserted as shown in FIG. 1, or it may be reversed 180° with ball 18 reversed to provide a higher level tow point while still retaining the damping hitch action. An elongated slot 34 is formed in each draw bar tube side wall 36, 38 in transverse alignment, and with each of slots 34 centrally aligning with receiver tube hole 24.

FIG. 2B illustrates a similar form of hitch wherein lubricant plastic strips 37 having holes 39 are employed between opposite side walls of draw bar tube 14 and the inner side walls of receiver tube 12A. The strips 37 may be such as UHMW (Ultra-High Molecular Weight) Polyethylene, available from various sources. Strips 37 provide abrasion resistance and eliminate both wear and certain shock effects due to lateral chatter of the hitch assembly.

Referring to FIG. 4, the rearward end of draw bar tube 14 is enclosed by means of a plate 40 secured therein as by welding and the entire interior of draw bar tube 14 is filled with a suitable resilient material 42 of selected hardness. A pin tube 44 of diameter to closely receive securing pin 30 is disposed transversly through resilient material 42 for central alignment with slots 34. The resilient material block 42 may be any one of a number of suitable plastics or rubber compounds exhibiting the required durometer hardness, but it has been found in practice that a block of natural rubber serves well when heated and caused to adhere to the inner tube walls and pin tube 44.

FIG. 5 illustrates an alternative type of draw bar tube 14a which includes an adjustability feature. The tube 14a is similarily constructed on the forward end with the L-shaped tow bar 16 affixed as by welding to extend the ball hole 32. The attitude of tube 14a is reversed from the prior showings such that the flat portion of tow bar 16 is placed on the upper side which, in operation, would provide a higher elevation hitch level. The draw bar tube 14a contains the similar resilient block 42 and pin tube 44 as aligned transversly with the central portion of slot 34. The rear end of tube 14a is then covered by a square plate 50 and secured as by welding. An adjustment bolt 52 is threaded through a hole 54 in plate 50 and rotatably fixed in a pressure pad 56. Thus, the bolt 52 can be rotated to move the pressure pad 56 either to compress or to lessen compression of the resilient spring block 42, and locking nuts 58 may be used to secure a selected position. Slight movement of pressure pad 56 is effective to greatly vary the spring characteristics of spring block 42.

FIG. 6 shows an alternative structure wherein a draw bar tube 14b includes a mechanical spring assembly in place of a resilient spring block member to achieve a similarly desirable vibration damping action. As shown in exploded form, a control block 60 formed of selected metal or plastic includes the transverse pin tube 44 as well as opposite end cavities 62 and 64 for receiving one end of respective compression springs 66 and 68. The entire compression spring assembly is inserted within tube 14b and the rear cover plate 40b is secured as by welding on the rear edge 70 of tube 14b to maintain the assembly in operative position. That is, pin tube 44 will be in transverse disposition and generally centrally located relative to slots 34 so that equivalent spring action will be exerted in either direction.

FIG. 7 illustrates an alternative form of construction wherein non-linear variability of reactance of the spring member may be varied. Thus, a draw bar tube 14c includes a generally central control block 72 having a transverse pin tube 74. Control block 72 may be formed of rubber, as shown, or it may be formed from a selected plastic or metal. A plurality of spring blocks 76, 78 and 80 are then arrayed in selected manner with control block 72 as all blocks are retained in tube 14c by means of an end plate 82. End plate 82 is maintained by a plurality of transversely arrayed compression or roll pins 84 as removably inserted within a plurality of transversely aligned holes 86.

The resilient spring blocks 76–80 may be selectively varied as to hardness and selection of combinations thereof function to vary the linearity of hitch response with amount of amplitude. This amounts to a very high degree of fine tuning of mechanical resonance and through empirical evaluation one would arrive at certain optimum spring blocks for use with certain types of load, i.e., house trailer, boat and trailer, etc. The roll pins 84 may be readily removed from tube 14c when it is removed from the receiver tube 12 and selected ones of the control block and spring blocks may be inserted. Once reassembled with the roll pins 84 replaced, they cannot slip out in any way since they are enclosed on each side by the rear portion of receiver tube 12.

FIG. 8 illustrates an alternative embodiment that includes a number of refinement features, particularly structure for eliminating abrasive effects of either horizontal or vertical sliding components. A receiver tube 12b is constructed in the manner illustrated in FIG. 2B to include the lubricant plastic side strips 37 on opposite sides of draw bar tube 14. Each of the opposite side lubricant strips 37 includes an aperture for alignment with aperture 24 to receive the hitch pin or bolt 30 therethrough. Presence of lubricant strips 37 greatly eases side to side chatter and knock that occur due to cross wind effects, highway crowning effects, and other causes for lateral displacement of the drive train.

In addition, up and down binding effects are eased by rollers. At the forward end of receiver tube 12b a pair of oppositely disposed journal blocks 90 having apertures 92 are welded, each to an opposite side of tube 12b. The bottom wall of tube 12b is formed with a cut out 94 and opposite side journal blocks 90 are welded in position such that a roller bearing 96 is maintained in contact with the lower side wall of draw bar tube 14, and slightly above the inner surface 98 of the bottom wall of receiver tube 12b. Thus, the roller bearing 96 maintains contact with the under side of tube 14 and supports it in rolling engagement. The rear end of receiver tube 12b has a similar top roller support of draw bar tube 14. A cut out 100 is formed transversely across the upper wall of receiver tube 12b and a pair of opposite side journal blocks 102 having respective holes 104 maintain a steel roller bearing 106 in contact with the upper wall surface 108 of draw bar tube 14. Thus, in addition to damping of surge and draw motions of the draw bar tube, wear due to side-to-side and up-and-down hammering of tube 14 relative to receiver tube 12b is also considerably lessened. The overall effect is to provide an extremely smooth ride that may be adjusted in various ways to accommodate varying weights of load as drawn from different heights of load.

FIG. 9 illustrates yet another form of adjustable tension trailer hitch assembly which includes a plurality of secondary enhancement features. The receiver tube 12c is adapted to include a rear plate 110 rigidly secured thereover as well as upper and lower lubricant plastic strips 112, 114 which are maintained in the assembly as by corner brackets 116, set screws 118 or other suitable means. A similar pair of lubricant plastic strips (not shown) can also be maintained on each side of draw bar tube 14d as shown in FIG. 2B. The draw bar tube 14d may include any of various internal spring arrangements. As shown, an internal roller bearing 120 has a central aperture 122 for receiving the hitch pin 30 therethrough. A plurality of resilient block members 124, 126, 128 and 130 of rubber or plastic, or combinations thereof, may be selectively placed within the tube 14d and in some cases a rigid spacer 132, one or more, may be inserted also. The spring assembly is then held tightly within tube 14d by means of an end block 134 and a plurality of roll pins 136 as secured through opposite side walls of tube 14d. The front end of draw bar tube 14d may also include a readily accessible adjustment bolt 138 as threaded through tow plate 16 into rotatable engagement with a pressure pad 140.

FIG. 10 illustrates a spring block member that may be adapted for a wide range of loads, a multiple spring device that is capable of assembly in a number of combinations enabling a wide variation in spring force. The spring block member 150 is adaptable for insertion in such as the draw bar tube 14c (FIG. 7). The central portion of spring member 150 consists of a four-cornered metal end block 152 having parallel front face surface 154 and rear face surface 156. A cylindrical, spring-aligning post 158 is unitarily, centrally formed on front face surface 154, and a similar post 160 is formed on surface 156. A hitch pin-receiving transverse hole 162 is formed centrally through the mid block 152.

A forward four-cornered end block 164 is formed with a spring seating surface 166 having a cylindrical spring alignment post 168 centrally formed thereon. In like manner, an opposite end four-cornered end block 170 includes a seating face 172 having a cylindrical post 174. Each of the blocks 152, 164 and 170 is of four-cornered formation of a size to be received slidingly within a draw bar tube 14c (FIG. 7).

The spring member 150 is adaptable to utilize all or any combination of the individual springs, heavy duty compression springs 176 and 178, and/or lighter compression springs 180 and 182. Thus, according to the trailer to be hauled, the tension of the hitch assembly 10 can be matched to the particular load. For lighter loads, springs 180 and 182 can be used alone, heavier loads can be hauled utilizing the large springs 176 and 178, and the very heavy loads requiring maximum constraint may utilize all of springs 180, 182, 176 and 178.

FIG. 11 illustrates a heavy duty hitch assembly 190 which incorporates shock absorbing apparatus to control the limits and rate of oscillation of the resilient hitch draw bar tube. The hitch assembly 190 consists essentially of the structure of FIG. 1 with addition of clevis attachment structure and a shock absorber 192, e.g., a Monroe adjustable type shock absorber of selected size and compressive limits. Assembly 190 consists of a receiver tube 12a having a mounting plate 20 and opposite side, transversely aligned holes 24 for receiving a hitch pin 30. A suitable clevis attachment 194 is welded along the forward underside of receiver tube 12a.

A draw bar tube 14d is formed with an L-shaped tow plate 16a whereupon a second clevis structure 196 is welded at the lower corner. The elongated slot 198 in this case is shown as a diamond shaped piece, and this is so formed for a specific reason. While the cut-out piece 200 is removed, the draw bar tube 14d is allowed to ride resiliently as it oscillates longitudinally about hole 24 and pin 30 of receiver tube 12a. In certain exigencies it may be desirable to mount a solid connection to the tow and in this case the opposite side cut-out pieces 20 may be reinserted into the side plates of draw bar tube 14d. Such necessity may come about for example as when attempting to pull a stuck tow vehicle or the like, but normally the cut-out plates 20 will not be used.

The shock absorber 192 is connected with the base end 202 connected within clevis structure 194 by means of a pivot bolt 204. Shock absorber 192 extends a rod 206 into pivotal affixure within clevis structure 196 by means of a pivot bolt 208. The knobs 210 and 212 provide adjustment of the shock absorber 192.

The shock absorber 192 is adjustable to dampen the action of the hitch according to the weight of the load being hauled. Repeated and fine adjustment is not necessary but peaking of ajustment is of very great help for heavier loads. The hitch assembly 190 including shock absorber 192 is an extreme asset when used with a trailer having an automatic hydraulic brake hitch. The hitch assembly 190 eliminates the excess braking that will usually be encountered on rough roads, and the shock absorber 192 allows the hydraulic brake to work only when the vehicle is coming to a stop. This tends to greatly increase the life of the automatic hydraulic hitch brake unit as it lessens the brake actuations by a considerable multiple.

The foregoing discloses a novel form of improved trailer hitch that embodies a number of different types of vibration and wear elimination features. Primarily, the hitch assembly functions to provide a very good, jerk free ride of a tow vehicle with trailed load, and the hitch assembly is susceptible of being varied in a number of ways to accommodate differing weights of trailer tow and/or different heights of tow point. While offering such versatile features, the hitch assembly is exceptionally easy to install on the tow vehicle and to maintain in safe and rigorous usage. It is also contemplated that some of the anti-vibration features of the present invention may be readily adapted for use with existing trailer hitches of the receiver tube/draw bar type.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. An improved trailer hitch for attachment to a towing vehicle, comprising:
    a receiver tube having first and second side walls and means attached thereto for securing to the towing vehicle, said receiver tube having transversely aligned holes formed through respective first and second side walls;
    a draw bar tube having first and second side walls and opposite first and second end walls to define an elongate void and having transversely aligned elongated slots formed through first and second side walls, said draw bar tube being closely received within said receiver tube;

resilient spring block means for filling said draw bar tube elongate void and having a transverse pin hole therethrough which is centrally aligned with said elongated slots;

trailer hitching means secured to a first end wall of said draw bar tube;

a hitch pin for securing through each of said receiver tube holes, the elongated holes and said pin hole; and shock absorbing means connected between said receiver tube and said draw bar tube and trailer hitching means.

2. A device as set forth in claim 1 wherein said draw bar tube further comprises:

an adjustment bolt threaded through one of said first and second end walls; and a pressure pad disposed in said void in contact with said spring block means and being rotatably connected to said adjustment bolt.

3. A device as set forth in claim 1 wherein one of said draw bar tube first and second end walls comprises:

an end wall plate insertable in said tube; and removable pin means securing said end wall plate in position in said tube.

4. A device as set forth in claim 1 wherein said spring block means comprises:

a mid-block having a transverse pin hole therethrough;

first and second opposite end blocks; and at least one springs insertable interchangeably between the mid-block and each respective opposite end blocks.

5. A device as set forth in claim 4 wherein one of said draw bar tube end walls comprises:

an end wall plate insertable in said tube; and removable pin means securing said end wall plate in position in said tube.

6. A device as set forth in claim 1 which further includes:

plural strips of lubricant plastic disposed between adjacent side walls of said receiver tube and draw bar tube.

7. A device as set forth in claim 1 which further comprises:

a first roller secured to the receiver tube first end and engaging the bottom of said draw bar tube in support proximate said trailer hitching means; and a second roller secured to the receiver tube opposite end and engaging the top of said draw bar tube.

8. A device as set forth in claim 7 which further includes:

plural strips of lubricant plastic disposed between adjacent side walls of said receiver tube and draw bar tube.

9. An improved trailer hitch for attachment to a towing vehicle, comprising:

a receiver tube having first and second side walls and means attached thereto for securing to the towing vehicle, said receiver tube having transversely aligned holes formed through respective first and second side walls;

a draw bar tube having first and second side walls and opposite first and second end walls to define an elongate void and having transversely aligned elongated slots formed through first and second side walls, said draw bar tube being closely received within said receiver tube;

resilient spring block means for filling said draw bar tube elongate void consisting of a mid-block having a transverse pin hole therethrough which is centrally aligned with said elongated slots, and first and second opposite end blocks, and at least one interchangeable spring retained between the mid-block and each respective first second opposite end blocks;

trailer hitching means secured to a first end wall of said draw bar tube; and a hitch pin for securing through each of said receiver tube holes, the elongated holes and said pin hole.

10. A device as set forth in claim 9 wherein said at least one interchangeable springs comprises:

first and second coil springs of lesser radius opitmally positionable between said mid-block and respective end blocks; and third and fourth coil springs of greater radius opitonally positionable between said mid-block and respective end blocks.

* * * * *